US012319520B2

(12) United States Patent
Biondi et al.

(10) Patent No.: US 12,319,520 B2
(45) Date of Patent: Jun. 3, 2025

(54) SINGLING UNIT FOR ARTICLES STACKED IN A NESTED CONFIGURATION

(71) Applicant: G.D S.P.A., Bologna (IT)

(72) Inventors: Andrea Biondi, Bologna (IT); Luca Cavazza, Bologna (IT); Enrico Campagnoli, Bologna (IT); Antonio Gigante, Bologna (IT); Umberto Zanetti, Bologna (IT)

(73) Assignee: G.D S.P.A., Bologna (IT)

( * ) Notice: Subject to any disclaimer, the term of this patent is extended or adjusted under 35 U.S.C. 154(b) by 55 days.

(21) Appl. No.: 17/998,248

(22) PCT Filed: Jul. 26, 2021

(86) PCT No.: PCT/IB2021/056703
§ 371 (c)(1),
(2) Date: Nov. 8, 2022

(87) PCT Pub. No.: WO2022/023920
PCT Pub. Date: Feb. 3, 2022

(65) Prior Publication Data
US 2023/0219773 A1 Jul. 13, 2023

(30) Foreign Application Priority Data

Jul. 29, 2020 (IT) .................. 102020000018424

(51) Int. Cl.
*B65G 59/10* (2006.01)
*B65B 29/02* (2006.01)
(Continued)

(52) U.S. Cl.
CPC .......... *B65G 59/107* (2013.01); *B65B 29/022* (2017.08); *B65B 43/44* (2013.01);
(Continued)

(58) Field of Classification Search
CPC .. B65G 59/107; B65G 47/681; B65G 47/848; B65G 59/103; B65G 59/108; B65B 29/022; B65B 43/44; B65B 43/46
See application file for complete search history.

(56) References Cited

U.S. PATENT DOCUMENTS 3,536,686 A   10/1970   Sasaki et al.
3,915,085 A * 10/1975   Lehmann ............... B41F 17/28
                                              198/689.1
(Continued)

FOREIGN PATENT DOCUMENTS

EP   0191158 A2   8/1986
EP   3263494 A1   1/2018
(Continued)

OTHER PUBLICATIONS

International Search Report and Written Opinion for PCT/IB2021/056703 filed on Jul. 26, 2021 in the name of G.D S.P.A., mailed on Oct. 1, 2021. 11 pages.

*Primary Examiner* — Lynn E Schwenning
(74) *Attorney, Agent, or Firm* — Steinfl + Bruno LLP

(57) ABSTRACT

A singling unit for articles stacked in a nested configuration includes at least two stacks of articles stacked in a nested configuration, an extractor group to extract single articles from each stack, and a conveyor to receive the articles singled by the extractor group and to transport them along an advance direction arranged in at least one row substantially parallel to the advance direction. The extractor group is configured to deposit on the conveyor the articles extracted from the stacks in a number of rows smaller than the number of the stacks.

18 Claims, 1 Drawing Sheet

(51) Int. Cl.
  *B65B 43/44* (2006.01)
  *B65B 43/46* (2006.01)
  *B65G 47/68* (2006.01)
  *B65G 47/84* (2006.01)

(52) U.S. Cl.
  CPC ............ *B65B 43/46* (2013.01); *B65G 47/681* (2013.01); *B65G 47/848* (2013.01); *B65G 59/103* (2013.01)

(56) References Cited

U.S. PATENT DOCUMENTS

| | | | |
|---|---|---|---|
| 4,697,691 A | | 10/1987 | Zodrow et al. |
| 6,098,785 A | * | 8/2000 | Van Maanen ........ B65G 47/915 |
| | | | 198/459.8 |
| 9,387,992 B2 | * | 7/2016 | Boschi ................ B65G 47/904 |
| 9,758,265 B2 | * | 9/2017 | Bellante ............... B65G 47/918 |
| 9,908,763 B2 | * | 3/2018 | Bagge ................... B66F 9/0655 |
| 10,858,207 B2 | * | 12/2020 | Knook ................. B65G 59/062 |

FOREIGN PATENT DOCUMENTS

| | | | | |
|---|---|---|---|---|
| FR | 1557824 A | | 2/1969 | |
| GB | 2438187 | * | 11/2007 | ............ B65B 43/42 |
| GB | 2438187 A | | 11/2007 | |
| WO | 2013/144835 A1 | | 10/2013 | |
| WO | WO 2013/144835 | * | 10/2013 | ............ B65H 29/02 |
| WO | 2022/023920 A1 | | 2/2022 | |

* cited by examiner

SINGLING UNIT FOR ARTICLES STACKED IN A NESTED CONFIGURATION

CROSS REFERENCE TO RELATED APPLICATIONS

The present application is the US National Stage of International Patent Application No. PCT/IB2021/056703, filed internationally on Jul. 26, 2021, which, in turn, claims priority to Italian Application No. IT 102020000018424, filed on Jul. 29, 2020.

The present invention relates to a singling unit for articles stacked in a nested configuration, which is particularly provided to individually feed such articles to one or more subsequent processing processes. It is also directed to a method for singling stacked articles in a nested configuration.

The present invention finds a preferred, though not exclusive, application in the field for preparing and packaging food and non-food products, an example of which is represented by the capsules for infusion type beverages, e.g. coffee, a product to which reference will be made below without loss of generality.

In particular, in this technical field, packaging apparatuses are known in which a plurality of containers are individually filled with the product to be packaged, in this case coffee, and then, after being closed by a special membrane, are sent to the final steps of boxing and packaging.

Generally, the containers in which the product to be packaged is delivered, have a tapered shape, for example generically a truncated conical shape, starting from the opening towards the respective bottom, so that, when still empty, they can be stacked one at least partially nested inside the other.

This so-called "nested" configuration allows minimising the space taken up by the empty containers during the transport and storage phase, and in this configuration they are supplied to the preparation and packaging process, which, before filling and packaging them, then has to remove the containers from the stack in order to enable them to be processed individually by the subsequent processing units.

In this description as well as in the accompanying claims, certain terms and expressions are deemed to have, unless otherwise expressly indicated, the meaning expressed in the following definitions.

The term "article" means any object having a formation such that a plurality of such articles can be stacked in a nested configuration.

The articles can be identical to each other, or they can differ from each other in some characteristics such as the composition or the colour.

The stacked articles preferably have the same shape, but may also differ slightly from each other, provided the capacity for mutual nesting is maintained.

Preferably, such articles are containers, intended to contain within them a product to be packaged, whether food or non-food, such as capsules for coffee or other infusion type beverages, yoghurt pots, wrappers for sweets or other foodstuffs, food trays, or pharmaceutical products and products generally intended for personal, household or industrial use.

Preferably, such articles have an opening and a bottom opposed thereto, which are joined together by one or more lateral walls so as to delimit a chamber in which the product to be packaged is accommodated.

Preferably such articles have a variable cross-sectional shape between the bottom and the opening, for example truncated conical or truncated pyramidal shape.

The articles are stacked in a "nested configuration", or are simply "nested", when each article in the stack, apart from the end article, is at least partially accommodated within a subsequent article.

"Row" (or "rows") of articles deposited on a conveyor refers to the row (or the rows) of articles aligned parallel to an advance direction of the conveyor.

In other words, articles aligned along directions transverse to the conveyor are not considered "rows".

The Applicant has observed that the operation of extracting a single article from a stack of nested articles may present certain difficulties which may limit the production capacity of the step of feeding the articles to subsequent processings.

In particular, the Applicant has observed that the extraction of a single article from the stack necessarily requires a preliminary movement of substantial translation along a direction defined by the longitudinal development of the stack and that only after such a movement the article can be moved substantially independently without interfering with the other articles that are still stacked.

The Applicant has also verified that in high-capacity production processes the use of rotary transfer devices is preferred, as they can operate continuously and advantageously avoid the mechanical complications and slowdowns due to the acceleration and deceleration phases of discontinuous transfer devices.

For example, the Applicant has verified that a transfer device comprising a wheel or a drum, or more generally a belt wound on a closed path, and on which a plurality of gripping devices are mounted with an ability of relative movement, which grasp an article from a departure station and retain it during the rotation of the wheel or of the drum or of the belt until they release it at an arrival station, is particularly effective and reliable in terms of production capacity and transfer precision.

However, the Applicant has found that the particular movement required to extract an article from a stack of nested articles limits the possibility of operating at very high speeds, even when an extractor group comprising a rotary transfer device is used.

The Applicant has therefore observed that the request for greater production capacity can be satisfied simply by adopting a singling unit which provides for the multiplication of the lines feeding the articles, thus increasing the number of rows of stacked articles, where each row is enslaved to a corresponding extractor group which in turn deposits the individually extracted articles on a respective row of one or more conveyors which take care of feeding the rows of articles to the downstream processing units.

However, the Applicant has also observed that this solution inevitably entails a larger footprint and greater complexity of both the singling unit and of the conveyor and, possibly, of the downstream article processing units, with a consequent increase in the relevant costs.

The Applicant has therefore perceived that the operation of singling articles could be significantly optimised by the provision of an extractor group which is provided to extract the articles from several rows of stacks of nested articles and to deposit them on a conveyor in a smaller number of rows.

This solution therefore makes it possible to achieve a high production capacity without affecting the quality of the extraction of the articles from the respective stacks and, at the same time, also to adapt the number of rows of articles to the needs of the article processings that are envisaged downstream.

The Applicant has finally found that such advantages can be achieved by means of a singling unit for articles stacked in a nested configuration, comprising an extractor group which is provided to extract single articles from each stack of a plurality of stacks of nested articles and to deposit them on a conveyor in a number of rows smaller than the number of the plurality of stacks.

Thus, in a first aspect thereof, the present invention is directed to a singling unit for articles stacked in a nested configuration, comprising at least two stacks of articles stacked in a nested configuration and an extractor group provided to extract single articles from each of said stacks.

Preferably, said singling unit comprises a conveyor provided to receive the articles singled by said extractor group.

Preferably, said conveyor is provided to transport said articles along an advance direction that are arranged in at least one row parallel to said advance direction.

Preferably, said extractor group is configured to deposit on said conveyor the articles extracted from said stacks in a number of rows smaller than the number of said stacks.

In a second aspect thereof, the present invention is directed to a method for singling articles stacked in a nested configuration.

Preferably, said method comprises the step of providing at least two stacks of said articles.

Preferably, said method comprises the step of extracting, by means of an extractor group, an article from each of said at least two stacks.

Preferably, said method comprises the step of depositing the articles extracted from each stack on a conveyor provided to transport said articles in at least one row substantially parallel to an advance direction of said conveyor.

Preferably, said articles are deposited on said conveyor in a number of rows smaller than the number of said stacks.

Thanks to these features, the singling unit according to the present invention is able to extract the single articles from the respective stacks at a not excessive speed, which allows to safely operate the required movements, and, at the same time, to keep the downstream conveyor compact by adapting the dimensioning thereof to the processing envisaged downstream of the singling unit.

In other words, thanks to the features of the present invention, the devices downstream of the extractor group are substantially released and made independent of the difficulties of the operation of extracting the articles from the stacks.

In a third aspect thereof, the present invention is directed to an apparatus for packaging capsules for infusion type beverages, comprising a plurality of stacks of empty capsules in a nested configuration, a singling unit for said empty capsules, and a unit for filling said capsules located downstream of said singling unit, wherein said singling unit is constructed according to the first aspect.

In at least one of the aforesaid aspects, the present invention may also have at least one of the preferred features set out below.

In some embodiments, said stacks of articles stacked in a nested configuration are fed to said extractor group on substantially horizontal support guides.

In this way, the weight of the articles on the upper part of the stack is prevented from being discharged onto the articles on the lower part of the stack, which might cause unwanted deformations and possible jamming among articles. This eventuality can lead to a malfunctioning of the operations for singling articles, particularly when this operation is carried out at high speed. On the other hand, the request for high production capacity usually also involves a high number of articles stacked in the feeding to the singling unit.

Preferably, said stacks of articles stacked in nested configuration are moved within said support guides towards said extractor group by means of respective transport belts.

Preferably, said transport belts are driven slidingly at the bottom of said transport guides so as to drag the stacks of nested articles towards the extractor group.

In one embodiment, a respective feeding device is envisaged which is provided to position, at a predetermined frequency, an end article of said stacks in a removal zone, so as to be removed by said extractor group.

Preferably, a respective feeding device is provided for each of said stacks.

Preferably, said feeding device is synchronized with said extractor group.

This ensures that the article arrives at the removal zone at the correct time to be picked up by the extractor group.

Preferably, said feeding device comprises one or more screws with a variable spacing groove, more preferably with an increasing spacing towards said removal zone.

In this way, the screw not only brings the articles into the correct position at the meeting with the extractor group, but also slightly distances the articles from each other, so as to ease the subsequent extraction operation.

Preferably, each feeding device is controlled independently of the other feeding devices.

In one embodiment, said singling unit comprises a control unit which is provided to block one or more of said feeding devices following a fault signal from one or more of said at least two corresponding stacks.

In this way, in the event of a fault limited to certain stacks, it is possible to stop only the feeding devices corresponding to them without stopping the entire production.

In one embodiment, said extractor group is provided to extract single articles from each of said stacks in a substantially simultaneous manner.

In this way, it is possible to plan a higher production capacity and a more homogeneous and gentle handling of the articles.

In one embodiment, said extractor group comprises an extractor wheel.

Preferably, said extractor wheel is rotatable about a main rotation axis.

Preferably, at least one first gripping head is mounted on said extractor wheel.

Preferably, at least two gripping elements are mounted on said first gripping head.

Preferably, each gripping element is provided in order to selectively retain one of said articles that have been extracted from said stacks.

In this way, the articles are extracted one at a time from the respective stacks by the gripping elements which are driven in rotation by the extractor wheel.

Preferably, the number of gripping elements mounted on each first gripping head is equal to the number of stacks of articles.

In this way, the end articles of each stack are extracted by the same first gripping head in a substantially simultaneous manner. Moreover, this advantageously allows to define a single movement for extracting the articles from the stacks, which applies for each gripping head.

Preferably, said at least one first gripping head is driven in rotation by said extractor wheel about said main rotation axis between a removal zone, wherein each of said gripping elements extracts an article from an end of a respective stack facing said extractor wheel, and a release zone, wherein each of said gripping elements releases said article.

In one embodiment, said at least one first gripping head is constrained to said extractor wheel by means of a cam mechanism which is suitably shaped to guide the displacement of said first gripping head with respect to said extractor wheel.

In this way, the movement of the first gripping head as well as the gripping elements that are mounted thereon can be defined with extreme precision and reliability both in its translation and rotation movements, so as to ensure the correct extraction of the end articles of the stacks facing the extractor wheel.

In alternative embodiments, the first gripping head can be moved by means of suitable electric motors.

Preferably, said main rotation axis of said extractor wheel is horizontal.

In some preferred embodiments, said at least two stacks are arranged substantially coplanar to said at least one row of articles deposited on said conveyor.

In this way, the articles can be extracted from the extractor group and deposited on the conveyor, minimising the movements to align the articles on the conveyor. It will be noted that since the number of rows of articles deposited on the conveyor is smaller than the number of the stacks of nested articles, at least two stacks are coplanar with each other to a respective row of articles deposited on the conveyor.

In a particular preferred embodiment, it is contemplated that a single row of articles is deposited on the conveyor and that all the stacks of nested articles are substantially coplanar with said row.

Preferably, said at least two stacks and said rows of articles deposited on the conveyor define respective radial planes of said extractor wheel.

In some embodiments, said extractor group is configured to deposit on said conveyor the articles extracted from said stacks in a single row.

In this way, maximum compaction of the conveyor is achieved, which feeds the single articles to the subsequent processing units.

Preferably, said stacks are coplanar relative to each other and said extractor group provides for orienting the articles extracted from said stacks so as to deposit them in a single row transported by the conveyor.

This operation can be achieved either by positioning all the stacks of articles on a plane coplanar with the single row to be deposited on the conveyor or by positioning the stacks on a different plane and then by correctly orienting the articles once they have been extracted, for example by rotating the gripping elements that retain them.

In one embodiment, said articles are stacked in two stacks.

Preferably, said gripping elements lie on the same radial plane as said extractor wheel.

In this way, when the articles are deposited on the conveyor in a single row, the gripping elements are in a substantially coplanar configuration with both the stacks of nested articles and the row of articles extracted individually from the stacks.

Preferably, said gripping elements are selectively connected to a pressure reduction circuit to retain said articles by suction.

Preferably, said articles are cup-shaped, wherein a bottom and a mouth that are longitudinally opposed are identified.

More preferably, said gripping elements retain said articles at said bottom.

In this way, the retention of the article by the gripping element is firmer, in particular when carried out by suction.

In one embodiment, said articles are deposited on said conveyor resting on said bottom.

In this way, the articles transported by the conveyor have a vertical position, advantageously provided for a possible subsequent article filling operation.

In one embodiment, said extractor group comprises an exchange wheel, provided to receive the articles extracted by said extractor wheel and to deposit them on said conveyor.

Preferably, said exchange wheel comprises at least a second gripping head configured to receive articles from a first gripping head and to deposit them on said conveyor.

Preferably, said exchange wheel retains the articles received from said extractor wheel at a mouth of said article.

Thanks to the provision of the exchange wheel, the articles can be deposited quickly and efficiently on the conveyor resting on the bottom in a vertical position.

In one embodiment, eight first gripping heads are mounted on said extractor wheel.

In one embodiment, four second gripping heads are mounted on said exchange wheel.

Preferably, said articles are deposited on said conveyor at a speed greater than 500 articles per minute, more preferably greater than 1000 articles per minute, even more preferably greater than 1200 articles per minute.

The characteristics and advantages of the invention will become clearer from the detailed description of an embodiment example illustrated, by way of non-limiting example, with reference to the appended drawings wherein.

Figure 1:
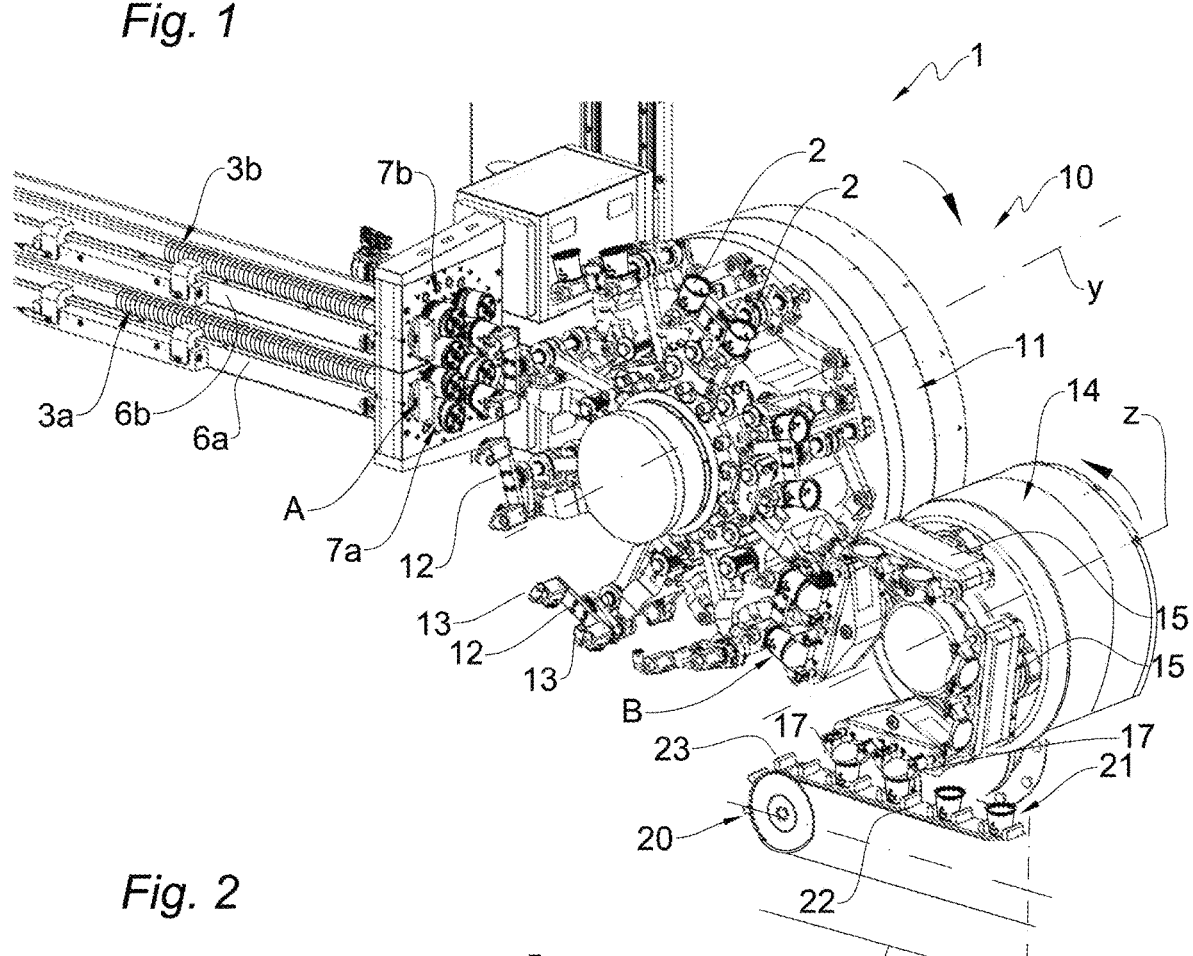
FIG. 1 is a schematic view in side perspective of a singling unit for articles made in accordance with the present invention.
Figure 2:
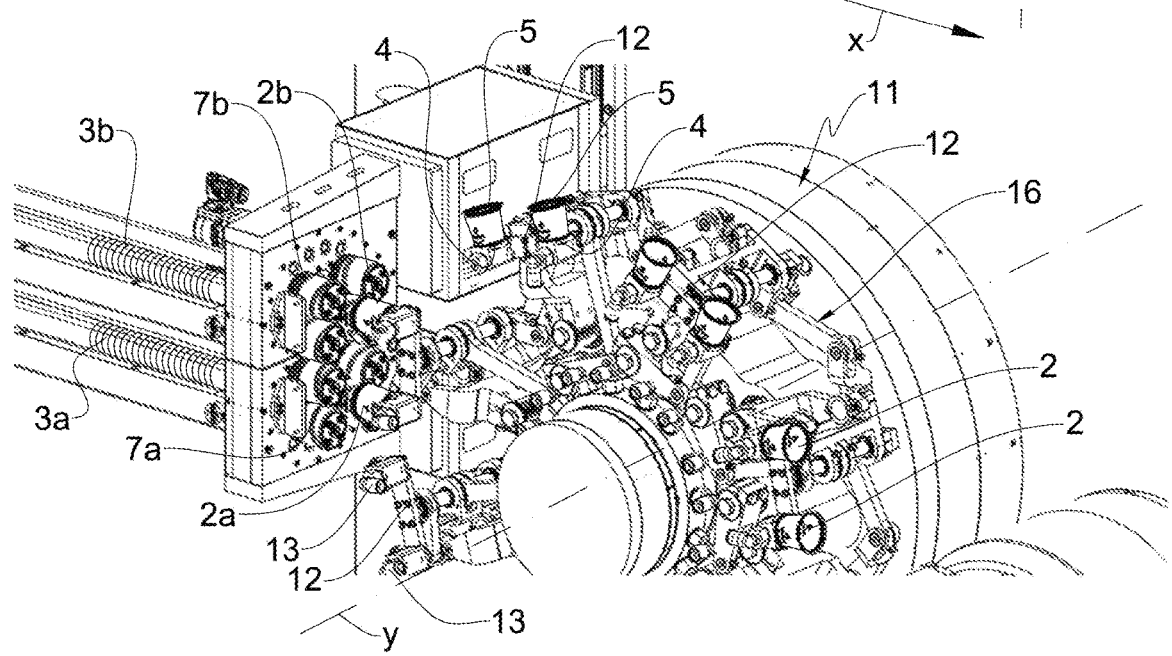
FIG. 2 is a schematic view in side perspective and on an enlarged scale of a portion of the singling unit in FIG. 1.

With reference to the accompanying figures, 1 indicates overall a singling unit constructed in accordance with the present invention.

The singling unit 1 further comprises an extractor group 10, provided to extract single articles 2 from stacks 3a and 3b, in which the articles 2 are stacked in a nested configuration, and to deposit them individually on a conveyor 20 which transports them along an advance direction X.

In the preferred case described herein, the articles 2 are empty capsules for infusion type beverages, e.g. coffee, intended to be filled with the appropriate powdered material required for the preparation of the beverage. However, the articles 2 may be objects intended for any other application as long as they can be stacked in a nested configuration.

The articles 2 are formed by a rigid, truncated cone-shaped casing comprising a bottom 4 from which a flared lateral wall extends towards an opening 5 opposed to the bottom 4, so as to allow the insertion of the bottom of an article into another article through the mouth thereof.

The singling unit 1, is part of an apparatus for preparing and packaging capsules for infusion type beverages, and comprises, in general terms, an article filling unit 2 and an article closing unit that are placed downstream of the singling unit 1.

In the preferred case described herein, two stacks of articles, 3a and 3b, are provided, while the articles 2 extracted by the extractor group 10 are deposited on the conveyor 20 to form a single row 21 substantially parallel to the advance direction X.

The stacks 3a, 3b are positioned on respective guides 6a and 6b, which are substantially horizontal, placed one above the other so that they belong to the same vertical plane.

In order to move the stacks 3a, 3b towards the extractor group 10, respective drive belts are also provided at the lower bases of the guides 6a, 6b.

In particular, the stacks 3a, 3b are oriented in such a manner that the bottom 4 of the articles 2 faces the extractor group 10.

Two feed devices 7a, 7b are provided between the guides 6a, 6b and the extractor group 10 and each of them is provided to place an end article 2a, 2b of the stacks 3a, 3b in a removal zone A in which it can be removed from the extractor group 10.

In particular, each feeding device comprises a group of screws are controlled to be rotated about their own axis at a speed synchronized with the extractor group, so that the end article 2a, 2b of the respective stack is in the removal zone A at exactly the time when it can be removed by the extractor group 10.

Preferably, four screws are provided for each feeding device 7a, 7b so that each article 2 can be effectively grasped and precisely conducted into the removal zone. In addition, the screws advantageously have a groove with an increasing spacing towards the extractor group 10, so as to space the end article 2a, 2b from the other articles of the respective stack.

The feeding devices 7a, and 7b are controlled independently, so that one of the two devices can be stopped without necessarily stopping the operation of the other.

The extractor group 10 comprises an extractor wheel 11, which is rotatable about a substantially horizontal main rotation axis Y, on which a plurality of first gripping heads 12, for example eight, equidistant from each other, is mounted.

A pair of gripping elements 13 is mounted on each first gripping head 12, each of which is provided to selectively retain an end article 2a, 2b from the stacks 3a and 3b, respectively.

The gripping elements 13 lie in the same radial plane as the extractor wheel 11, substantially coplanar with the guides 6a, 6b that support the stacks 3a, 3b and with the row of articles 21 transported by the conveyor 20.

The gripping elements 13 are also selectively connected to a pressure reduction circuit, which allows them to retain the articles 2 by suction at the bottom 4.

Preferably, the two gripping elements 13 of the same first gripping head 12 can be connected to the pressure reduction circuit independently of each other.

The first gripping heads 12 are driven in rotation by the extractor wheel 11 about the main rotation axis Y between a removal zone A, where the gripping elements 13 extract an end article 2a, 2b from the respective stacks 3a, 3b, and a release zone B, where the gripping elements 13 release the articles to an exchange wheel 14 of the extractor group 10.

Each first gripping head is mounted on the extractor wheel 11 with an ability of relative movement with respect to the same, which is obtained thanks to a suitably shaped cam mechanism 16.

The exchange wheel 14 rotates about a main rotation axis Z, which is substantially horizontal and parallel to the rotation axis Y of the extractor wheel 11.

The exchange wheel 14 is further provided with second gripping heads 15, for example four, substantially coplanar with the gripping elements 13 and provided to receive the articles 2 released from the gripping elements 13 at the release zone B, and to deposit them on the conveyor 20 to form the row 21.

In particular, each second gripping head 15 is provided with two pairs of pincers 17 which are provided to grip the articles 2 at the mouth thereof 5.

The exchange wheel 14 is synchronized with the extractor wheel 11 and takes care of retaining the articles 2 at the respective mouths thereof 5 and then deposits them on the conveyor 20 in a vertical position, resting on the bottom 4.

The conveyor 20 comprises a conveyor belt 22, which extends along the feed direction X from the extractor group 10 to the subsequent processing unit of the articles 2. Abutment elements 23 may be provided on the conveyor belt 22, which are standing transversely from the conveyor belt 22 and positioned uniformly at a spacing similar to the section of an article 2. The function of the abutment elements 23 is to favour keeping the vertical position of the articles 2 both during the deposition and transport phases.

The singling unit 1 is also provided with a control unit capable of receiving any fault signals from one of the two stacks 3a, 3b and consequently blocking the respective feeding device 7a, 7b, while keeping the other feeding device in operation, so that the feeding of both stacks does not have to be blocked due to a fault in one stack.

In addition, in the event of a fault in one of the two stacks 3a, 3b, the control unit may bypass the connection to the pressure reduction circuit of the gripping elements 13 intended to extract the articles from the stack in which the fault was detected.

Furthermore, the control unit may bypass the connection to the pressure reduction circuit of the gripping elements 13 and/or the respective feeding device 7a, 7b, even in the event of a fault of a processing station downstream of the singling unit 1.

The singling unit 1 operates as follows.

The stacks 3a and 3b, which are suitably supported by the guides 6a and 6b, are conducted towards the respective feeding devices 7a and 7b, where the screws take care of engaging the end articles 2a and 2b of the respective stack 3a, 3b, for example at the mouths and of bringing them towards the removal zone A at a time frequency synchronized with the movement of the extractor wheel 11. The screws, thanks to the increasing spacing of their groove, also slightly spacing the end articles 2a, 2b and the immediately subsequent article 2.

In the removal zone, the end articles 2a, 2b are engaged at the respective bottoms 4 by the gripping elements 13 of a first gripping head 12 which, at the same time, completely extracts them from the respective stack 3a, 3b.

This movement, which substantially consists in a translation of the first gripping head 12 along the longitudinal direction of the stack while maintaining the orientation of the gripping elements 13 constant, is obtained thanks to the cam mechanism 16.

Once removed by a sufficient amount so as to no longer interfere with the subsequent articles of the respective stack, the end articles 2a, 2b are brought by the first gripping head 12 up to the release zone B. In this zone, the gripping elements 13 release the respective articles (e.g. by closing the connection with the pressure reduction circuit) to a corresponding second gripping head 15 of the exchange wheel 14 which, by retaining them from the side of the mouth 5, brings them in rotation up to the conveyor 20.

The latter is advantageously positioned vertically under the exchange wheel 14, so that the articles 2 are released onto the conveyor in a vertical position and resting on its bottom 4.

Suitably, the conveyor is conducted along the advance direction X at a speed substantially equal to the peripheral speed of the articles 2 rotating on the exchange wheel 14, so that their resting on the conveyor occurs without abrupt accelerations or decelerations. Advantageously, the articles 2 are deposited on the conveyor belt 22 between adjacent pairs of abutment elements 23, which in the first instance facilitate the correct positioning of the articles 2 on the conveyor 20 and, in addition, help to keep them in the correct position during their transport.

Thanks to the features of the present invention, the singling unit 1 is able to supply a high number of articles 2 to the subsequent processing units in a single row 21 transported on the conveyor 20.

In particular, the singling unit 1 can deposit more than 1200 articles per minute on the conveyor 20, i.e. around 1500 articles per minute, from two separate stacks of nested articles.

The invention claimed is:

1. A singling unit for articles stacked in a nested configuration, comprising:
    at least two stacks of articles stacked in a nested configuration,
    an extractor group configured to extract single articles from each of said at least two stacks, the extractor group comprising:
        an extractor wheel configured to rotate about a main rotation axis,
        at least one first gripping head mounted on said extractor wheel, and
        at least two gripping elements, each mounted on said at least one first gripping head, each gripping element being configured to selectively retain one of said articles extracted from said at least two stacks of articles, and
    a conveyor configured to receive the articles singled by said extractor group and to transport the articles along an advance direction with the articles arranged in at least one row substantially parallel to said advance direction,
    wherein said extractor group is configured to deposit on said conveyor the articles extracted from said stacks in a number of rows smaller than the number of said at least two stacks.

2. The singling unit according to claim 1, further comprising substantially horizontal support guides on which said at least two stacks are to be fed to said extractor group.

3. The singling unit according to claim 1, further comprising, for each of said stacks, a respective feed device to position, at a predetermined frequency, an end article of the at least two stacks in a removal zone for picking up by said extractor group.

4. The singling unit according to claim 1, wherein said extractor group is configured to extract single articles from each of said at least two stacks in a substantially simultaneous manner.

5. The singling unit according to claim 1, wherein the number of gripping elements is equal to the number of said at least two stacks of articles.

6. The singling unit according to claim 1, wherein said at least one first gripping head is configured to be rotated by said extractor wheel about said main rotation axis between (i) a removal zone, in which each of said gripping elements extracts an article from one end of a corresponding stack facing said extractor wheel, and (ii) a release zone, in which each of said gripping elements releases said article.

7. The singling unit according to claim 1, further comprising a cam mechanism constraining said at least one first gripping head to said extractor wheel, the cam mechanism being configured to guide a movement of said first gripping head relative to said extractor wheel.

8. The singling unit according to claim 1, wherein said main rotation axis of said extractor wheel is horizontal.

9. The singling unit according to claim 1, wherein said at least two stacks are arranged substantially coplanar to said at least one row of articles deposited on said conveyor.

10. The singling unit according to claim 1, wherein said extractor group is configured to deposit on said conveyor the articles extracted from said at least two stacks in a single row.

11. The singling unit according to claim 1, wherein said gripping elements lie on a same radial plane as said extractor wheel.

12. The singling unit according to claim 1, wherein said gripping elements are selectively connected to a pressure reduction circuit to retain said articles by suction.

13. The singling unit according to claim 1, wherein
    said articles are cup-shaped with longitudinally opposed cup bottom and cup mouth,
    and
    said gripping elements retain each corresponding article on said cup bottom.

14. The singling unit according to claim 1, wherein said extractor group comprises an exchange wheel, configured to receive the articles extracted by said extractor wheel and to deposit the articles on said conveyor.

15. The singling unit according to claim 14, wherein said exchange wheel comprises at least one second gripping head configured to receive the articles from said at least one first gripping head of said extractor wheel and to deposit the articles on said conveyor.

16. An apparatus for packaging capsules for infusion type beverages, comprising
    a plurality of stacks of empty capsules in a nested configuration, and
    the singling unit according to claim 1 for said empty capsules,
    wherein said empty capsules are configured to be filled downstream of said singling unit.

17. A method for singling articles stacked in a nested configuration, comprising:
    providing at least two stacks of said stacked articles,
    extracting, by an extractor group, one article from each of said at least two stacks, and
    depositing the articles extracted from each stack on a conveyor configured to transport said articles in at least one row substantially parallel to an advance direction of said conveyor, the number of rows being smaller than the number of said at least two stacks
    wherein the extractor group comprises:
        an extractor wheel configured to rotate about a main rotation axis,
        at least one first gripping head mounted on said extractor wheel, and
        at least two gripping elements, each mounted on said at least one first gripping head, each gripping element being configured to selectively retain one of said articles extracted from said at least two stacks of stacked articles.

18. The method according to claim 17, wherein said articles are deposited on said conveyor at a speed greater than 500 articles per minute.

\* \* \* \* \*